(12) United States Patent
Gabriel

(10) Patent No.: US 7,593,965 B2
(45) Date of Patent: Sep. 22, 2009

(54) SYSTEM OF CUSTOMIZING AND PRESENTING INTERNET CONTENT TO ASSOCIATE ADVERTISING THEREWITH

(75) Inventor: Ty William Gabriel, San Francisco, CA (US)

(73) Assignee: Doubledip LLC, San Francisco, CA (US)

( * ) Notice: Subject to any disclaimer, the term of this patent is extended or adjusted under 35 U.S.C. 154(b) by 155 days.

(21) Appl. No.: 11/447,414

(22) Filed: Jun. 6, 2006

(65) Prior Publication Data
US 2007/0282906 A1 Dec. 6, 2007

Related U.S. Application Data

(60) Provisional application No. 60/799,416, filed on May 10, 2006.

(51) Int. Cl.
G06F 17/30 (2006.01)
(52) U.S. Cl. .................. 707/104.1; 707/200; 705/37; 715/233
(58) Field of Classification Search .......... 707/104.1, 707/3–5, 101, 102, 200; 715/14, 230, 233; 705/12, 27, 37
See application file for complete search history.

(56) References Cited

U.S. PATENT DOCUMENTS

| | | | | |
|---|---|---|---|---|
| 6,415,320 | B1 * | 7/2002 | Hess et al. | 709/219 |
| 6,804,659 | B1 * | 10/2004 | Graham et al. | 705/14 |
| 6,859,909 | B1 | 2/2005 | Lerner et al. | 715/203 |
| 7,433,843 | B2 * | 10/2008 | Brightbill | 705/37 |
| 2005/0210393 | A1 * | 9/2005 | Maeng | 715/751 |

OTHER PUBLICATIONS

PCT International Search Report, Dec. 12, 2008.

* cited by examiner

*Primary Examiner*—Cheryl Lewis
(74) *Attorney, Agent, or Firm*—Gordon & Rees LLP

(57) ABSTRACT

A method of associating advertising to internet content, including: uploading content to a website or editing content on a website; selecting annotations that correspond to the content; uploading the annotations to the website or editing annotations on a website; associating the annotations with the content; associating advertising with the annotations; and presenting the content on the internet with the advertising associated to the content.

29 Claims, 4 Drawing Sheets

US 7,593,965 B2

SYSTEM OF CUSTOMIZING AND PRESENTING INTERNET CONTENT TO ASSOCIATE ADVERTISING THEREWITH

RELATED APPLICATION

The present application is a non-provisional application of U.S. Provisional Patent Application Ser. No. 60/799,416, entitled "System of Customizing and Presenting Internet Content to Associate Advertising Therewith", filed May 10, 2006. This provisional patent application is herein expressly incorporated by reference in its entirety for all purposes.

TECHNICAL FIELD

The present invention relates to systems of presenting advertising on the internet so that the advertising is individually tailored to the content as viewed by different particular internet users.

BACKGROUND OF THE INVENTION

The internet offers the perfect media for targeted advertising. This is due to the fact that different individuals view different content depending upon their particular interests and search patterns.

In the past, on line advertisements are typically based on static placement. For example, an advertiser will typically purchase advertisement space on a web-site or search engine regardless of the content of the webpage. For example, a webpage displaying or discussing cars can also have automotive advertising presented therewith. Alternately, advertisements may be based on the results of key word searches This problem is especially true with regard to videos presented on the internet. In addition, when individual persons create and post their own videos (or their own static content such as photographs) to the internet, there is no known system for effectively presenting targeted advertising (with the exception of traditional key word based advertising) to those other persons selecting and then viewing the videos (or static content such as photographs).

What is instead desired is an automatic system where targeted advertising is presented to viewers of internet content such that different people can post their own content to the internet, with the persons viewing the internet content receiving advertising that is associated with the internet content selected by the viewers.

SUMMARY OF THE INVENTION

The present invention provides methods and systems of associating advertising to internet content, by: uploading content to a website; selecting annotations that correspond to the content; uploading the annotations to the website (or editing the annotations on the website); associating the annotations with the content; associating advertising with the annotations; and presenting the content on the internet with the advertising associated to the content. In various aspects of the invention, the content creator can upload the content (and/or annotations) and then edit the content (and/or annotations) on the website. In other optional aspects, someone other than the content creator can upload the content (and/or annotations). For example, a service may be provided to the content creator (or others) to actually perform the uploading of the content. It is to be understood that "uploading" described herein covers any system of uploading the content performed in any way and by any person.

In preferred aspects, the content uploaded to the internet is a video; however, the present invention is not so limited. For example, the present invention also encompasses static content such as photographs, illustrations, drawings and text.

In optional aspects of the invention, video content can be segmented into time intervals, with particular annotations being associated with each segment of the video. For example, a 6 minute video may be segmented into three 2 minute intervals with different annotations being associated with each 2 minute segment of the video.

In preferred aspects, the annotations are selected by a creator of the content itself. This person is typically the person who also uploads the content directly to the internet. It is to be understood, however, that the present invention is not so limited. For example, someone other than the content creator may add (or edit) annotations.

The annotations the creator selects may include a general written description of the content, or key words describing or relating to the content. In optional aspects, the annotations may also correspond directly to product identifiers or product codes.

Advertising is then, associated to the content. In one approach, advertising is associated to the content by presenting the annotations to a plurality of advertisers; having the plurality of advertisers bid on the annotations; and then selecting a preferred advertiser having a winning bid from among the plurality of advertisers. In another approach, advertising is associated to the content by presenting the annotations to a plurality of advertisers; and then having individual advertisers purchase individual annotations.

In various aspects, the annotations may be sent to an advertising server and the advertising server then associates the advertising with the annotations. Alternately, the annotations may be sent to a $3^{rd}$ party advertising service and the $3^{rd}$ party advertising service then associates the advertising with the annotations.

The content is viewed on the internet by a plurality of viewers. Revenue generation events may include purchases made by the plurality of viewers occasionally buying products or services corresponding to the advertising associated to the content. However, revenue generation events may also include (but are not limited to) "roll overs" (i.e.: the movement of a cursor over an item of interest) and "click-throughs" (i.e.: clicking on a link associated with advertising. Thus, revenue generation events, as discussed herein, may include actual purchases, but may also include simple viewing of advertisements without purchases being made. In accordance with an aspect of the invention, a portion of revenue resulting from the revenue generation events may be directed to the creator (uploader or editor) of the content.

In optional aspects of the invention, the creator of the internet content may select a product corresponding to the content. The system then presents the content on the internet to the plurality of viewers with the product directly associated to the content.

In optional aspects of the invention, when a viewer moves his/her cursor over the product shown in a photograph or video, an advertisement for the product (or otherwise associated with the content) is displayed. The advertisement may optionally appear in a pop-up window, or in a separate section of an existing window, or in a media player.

In optional aspects, selecting annotations that correspond to the content comprises selecting a product corresponding to the content.

The present invention also provides a method and system of associating products to internet content, by: uploading content to a website; selecting a product that corresponds to the content; uploading a product identifier to the website (or editing a product identifier on the website), the product identifier corresponding to the product; associating the product identifier with the content; and presenting the content on the internet with the product identifier associated to the content. As stated above, someone other than the content creator can upload the content (and/or product identifiers). For example, a service may be provided to the content creator to actually perform the uploading of the content (and/or product identifiers). It is to be understood that "uploading" described herein covers any system of uploading the content (and/or product identifiers) performed in any way and by any person.

The product identifier may include, but is not limited to, a UPC code or an ISBN code.

The product identifiers may be selected by a creator (or owner) of the content, the content is viewed on the internet by a plurality of viewers, and revenue generation events are generated by the plurality of viewers viewing the product identifiers associated to the content. In accordance with the present invention, a portion of the revenue generated from the revenue generation events may be directed to the creator of the content. In addition, the product identifier may be associated with the content by linking the product to an advertiser's website, such that a viewer is directed to the advertiser's website.

DETAILED DESCRIPTION OF THE DRAWINGS

Figure 1:
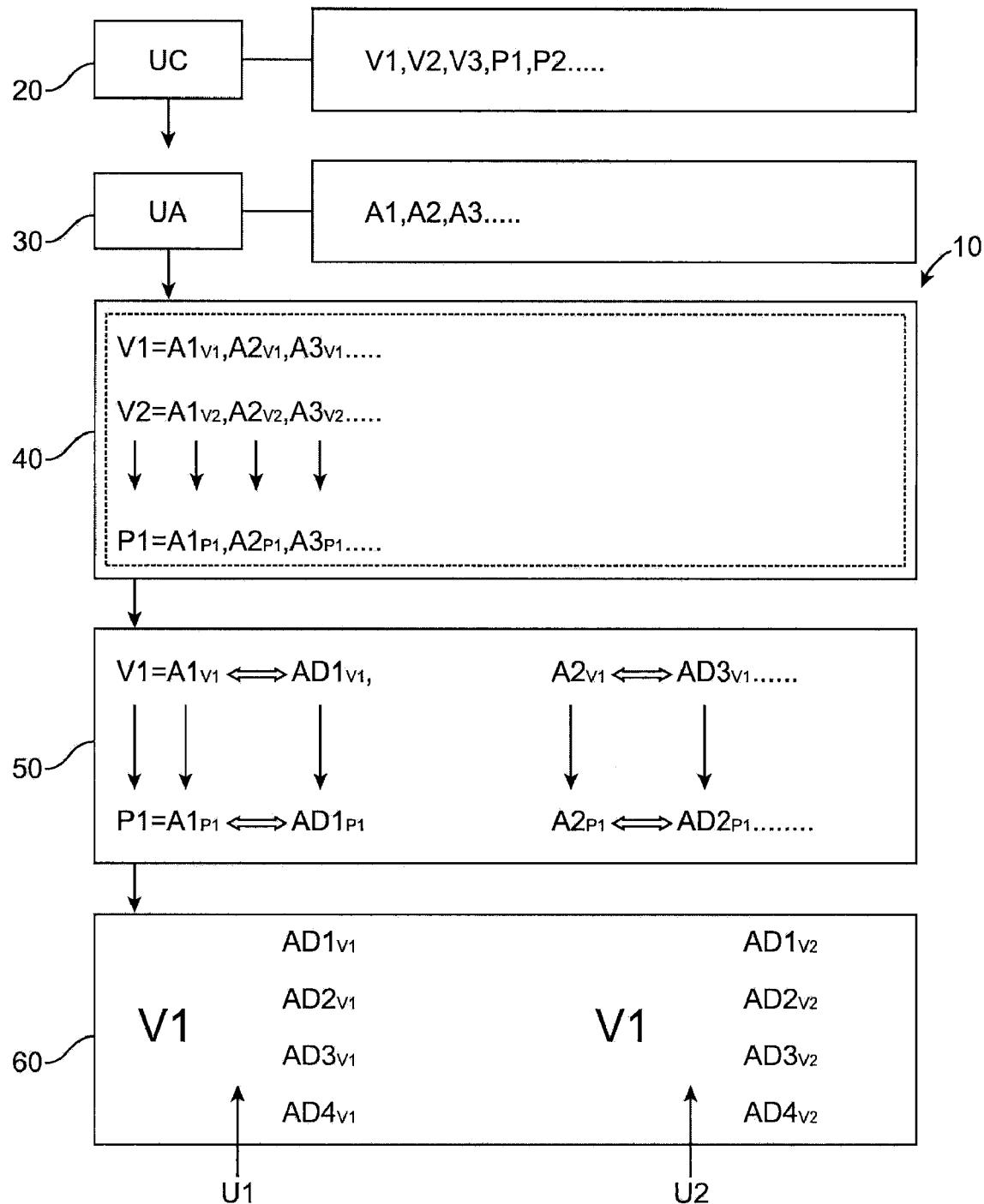
FIG. 1 is a flow chart illustrating operation of an aspect of the invention.
Figure 2:
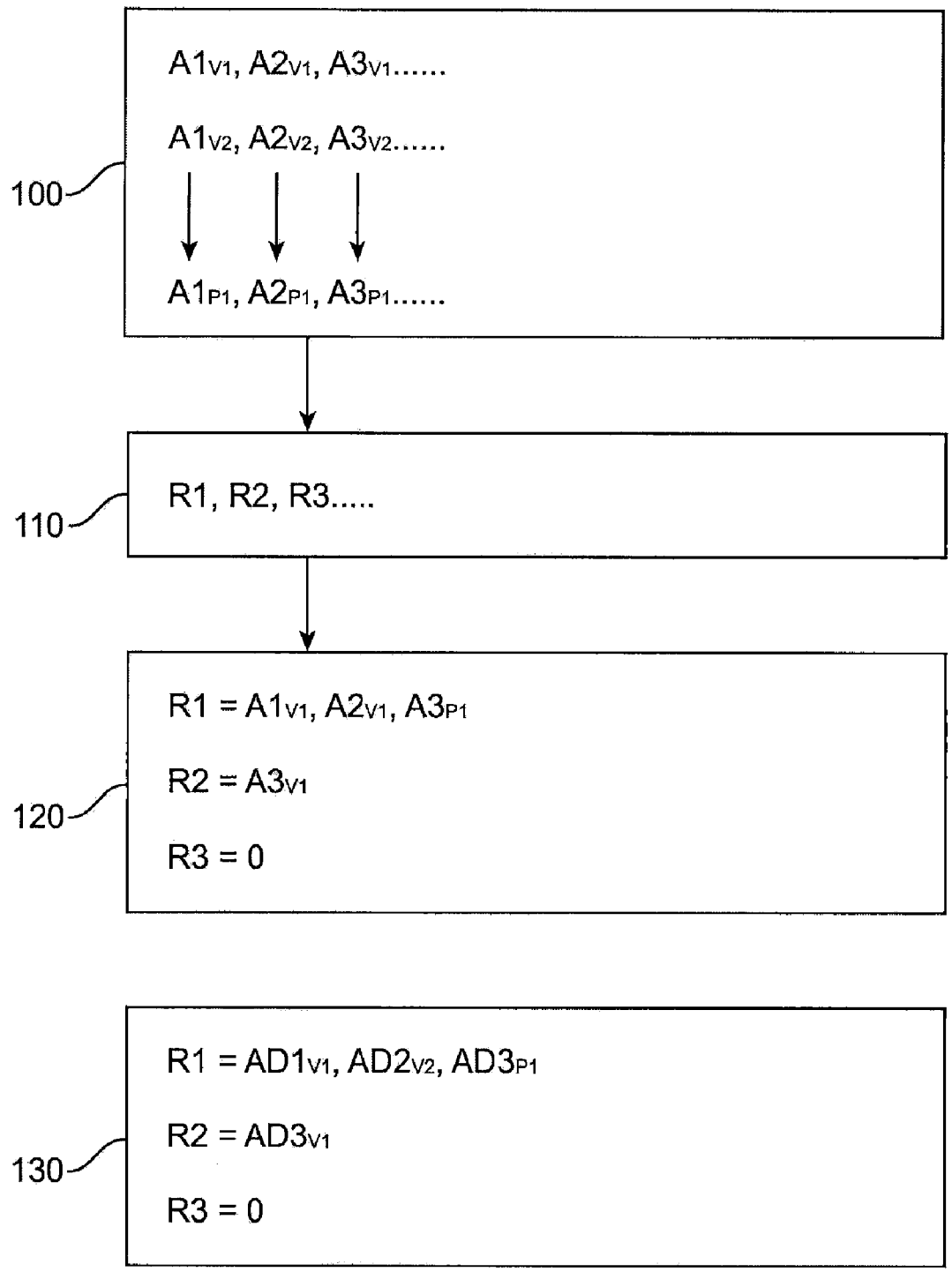
FIG. 2 is a flow chart illustrating selection of advertisers in accordance with the invention.

FIGS. 1 and 2 are flow charts illustrating operation of aspects of the present invention, as follows. As seen in FIG. 1, a system 10 is provided. In accordance with the present invention, system 10 may be a method, or it may be a computer program or system operating in accordance with the described method.

System 10 provides a method of associating advertising to internet content, as follows. A content creator first selects internet content and uploads the content to the internet. This is shown as step 20. The internet content selected may include any of videos V1, V2, V3, or photographs P1 or P2. In one preferred aspect of the invention, the internet content selected is video content. It is to be understood, however, that the present invention is not so limited. For example, photographs, illustrations, drawings and text may also be used.

In exemplary applications of the present invention, the internet content is content authored or created by the content creator. For example, the content may include videos taken by the operator such as: V1="Me playing guitar", V2="Me camping with my family", V3="My dog Spot playing in the park", etc. Exemplary content may also include photographs such as: P1="My car", P2="My grandpa", etc.

Next, the content creator selects annotations (A1, A2, A3, etc.) that correspond to the uploaded content. These annotations are then uploaded (by the content creator) to the internet. This is shown as step 30. The annotations may comprise written general descriptions of the content, or key words, phrases or symbols describing or otherwise associated to the content.

Next, a computer system associates the annotations to the content. This is shown as step 40. Following the above example, video V1 ("Me playing guitar") may have annotations as follows: $A1_{V1}$="Guitar", $A2_{V1}$="Guitar Strap", $A3_{V1}$="Sweat Shirt", $A4_{V1}$="Poster". Similarly, video V2 ("Me camping with my family") may have annotations as follows: $A1_{V2}$="Yosemite Park", $A2_{V2}$="Tent", $A3_{V2}$="Camp Stove", $A4_{V2}$="Backpack". Similarly, video V3 ("My dog Spot playing in the park") may have annotations as follows: $A1_{V3}$="Golden Gate Park", $A2_{V3}$="Dog Leash", $A3_{V3}$="German Shepard", $A4_{V3}$="Dog Collar".

Next, a computer system associates advertising with the annotations. This is shown as step 50. Following the above example, video V1 ("Me playing guitar") has annotations: $A1_{V1}$="Guitar", $A2_{V1}$="Guitar Strap", $A3_{V1}$="Sweat Shirt", $A4_{V1}$="Poster" as stated above. Advertising is now associated directly to each of these annotations $A1_{V1}$, $A2_{V1}$, $A3_{V1}$ and $A4_{V1}$ as follows: $AD_{V1}$ is associated to $A1_{V1}$. For example, $AD1_{V1}$ can be an advertisement for a new guitar sent from "Guitar.com" corresponding to annotation $A1_{V1}$="Guitar". Similarly, $AD2_{V1}$ is associated to $A2_{V1}$. For example, $AD2_{V1}$ can be an advertisement for a new guitar strap sent from "GuitarStrap.com" corresponding to annotation $A1_{V1}$="Guitar strap". Similarly, $AD3_{V1}$ is associated to $A3_{V1}$. For example, $AD3_{V1}$ can be an advertisement from a clothing retailer such as Old Navy™ for clothing corresponding to annotation $A3_{V1}$="Sweat Shirt". Similarly, $AD4_{V1}$ is associated to $A4_{V1}$. For example, $AD4_{V1}$ can be an advertisement from an on-line poster shop corresponding to annotation $A4_{V1}$="Poster".

Similarly, advertising (including links, pop-ups, etc.) can be associated with each of the annotations uploaded by the content creator. For example: advertising $AD1_{P1}$ is associated with annotation $A1_{P1}$; advertising $AD2_{P1}$ is associated with annotation $A2_{P1}$; and advertising $AD3_{P1}$ is associated with annotation $A3_{P1}$.

As can be seen, the internet content creator (or owner) can upload as many videos V1, V2, V3 or as many photographs P1, P2 as (s)he desires. For each one of these items uploaded to the internet, the content creator can create (and upload) as many annotations A1, A2, A3 as (s)he desires. In fact, a content creator may upload as few as one video (or photograph) and as few as one annotation describing (or otherwise corresponding to) the content.

In accordance with the present invention, there can be any number of different content creators/owners using the invention. Each of these content creators/owners may interact with the present computer system at the same time, or at different times. When a plurality of internet content creators are using the present invention at the same time, each of them follows the method and system shown in FIG. 1, and as described above.

Next, the computer system presents the content on the internet with the advertising associated to the content. This is shown as step 60. For example, two users U1 and U2 may be surfing the internet. User U1 may decide to watch video V1 ("Me playing guitar"). As user U1 watches video V1, advertisements $AD1_{V1}$ (a link or pop-up from "Guitar.com") $AD2_{V1}$ (a link or pop-up from "GuitarStrap.com") $AD3_{V1}$ (a link or pup-up from "Old Navy™") and $AD4_{V1}$ (a link or pop-up from an on-line poser store) also appear on the user's screen.

Similarly, user U2 instead decides to watch video V2. ("Me camping with my family"). As user U2 watches video V2, various advertisements for "Yosemite Park", "Tents", "Camp Stoves" and "Backpacks" (i.e.: $AD1_{V2}$, $AD2_{V2}$, $AD3_{V2}$ and $AD4_{V2}$) will appear on that user's screen.

In optional aspects of the present invention, the content creator can segment his/her videos V1, V2, V3, etc. into time intervals; and associate annotations with each segment of the video. For example, a 6 minute video may be segmented into three 2 minute segments with different sets of annotations being associated with each segment of the video. This can be especially entertaining when, for example, an object is only shown for a short period of time during a video. For example, a German Sheppard runs across the video screen during the video, and a pop-up advertisement for a dog breeder is displayed.

FIG. 2 illustrates an exemplary system for associating advertisements (and their respective retailers) to the annotations initially selected by the content creator. Thus, FIG. 2 expands upon and further explains step 50 shown in FIG. 1, as follows. The annotations as shown in box 100 are presented to a plurality of retailers R1, R2, R3, etc. in box 110. Note: the annotations shown in box 100 are the same as those shown in step 40 in FIG. 1. Particular retailers R1, R2, R3 are then associated with various annotations. This is shown in step 120 where (for example) retailer R1 is associated with annotations $A1_{V1}$, $A2_{V1}$ and $A3_{P1}$. Retailer R2 is only associated with annotation $A3_{V1}$. Retailer R3 is not associated with any annotations. (Note: various different systems and methods of associating particular retailers R with particular annotations A are described fully below.) Next, as shown in step 130, the individual retailers may compose and submit advertisements corresponding to the annotations with which the retailers R have become associated. Thus, retailer R1 prepares and submits advertisements $AD1_{V1}$, $AD2_{V2}$ and $AD3_{P1}$. Retailer R2 only prepares advertisement $AD3_{V1}$. Retailer R3 prepares no advertisements.

Following the above example, retailer R1 may be a musical instrument supplier who has become associated with the annotations "guitar" (i.e.: annotation $A1_{V1}$) and "guitar strap" (i.e.: annotation $A2_{V1}$). Retailer R1 may also become associated with an annotation ($A3_{P1}$) associates with another photograph (P3). Note: photograph P3 may, or may not, have been posted to the internet by the same content creator that posted videos V2 and V3.

Thus, (as shown in step 60 in FIG. 1) when a user U1 views video V1 of "Me Playing Guitar", (s)he will also be presented with two advertisements from advertiser R1 (i.e.: the musical instrument supplier showing an advertisement for a guitar (i.e.: $AD1_{V1}$) and a guitar strap (i.e. $AD2_{V2}$). Other advertisements from other retailers (i.e.: the retailers associated with advertisements $AD3_{V1}$ and $AD4_{V1}$) will also be seen by user U1 when viewing video V1.

Thus, in accordance with the present invention, different users U1, U2, etc. may see different combinations of advertisements ADs when viewing different (or the same) content on the internet. In some circumstances, advertisements from different advertisers/retailers R are shown on the same screen viewed by the same user. In other circumstances, more than one advertisement from the same advertiser/retailer is viewed on the same screen viewed by the same user. As explained above, when the content is video content that has been segmented into time intervals, the various advertisers/retailers (and their particular advertisements) presented to the user is or may be constantly changing.

As explained above, various advertiser/retailers R1, R2, R2 can be associated with each of the various annotations $A1_{V1}$, $A2_{V2}$ ... $A1_{V2}$, $A2_{V2}$ ... $A1_{P1}$, $A2_{P2}$, ... etc. It is to be understood that the present invention is not limited to any particular system of associating retailers' advertisements to content creators' annotations. However, two exemplary methods of performing such associations are presented below.

In one aspect, the annotations $A1_{V1}$, $A2_{V2}$ ... $A1_{V2}$, $A2_{V2}$ ... $A1_{P1}$, $A2_{P2}$, ... etc. are presented to a plurality of advertisers (e.g.: retailers R1, R2, R3, etc.). Advertisers R1, R2, R3, etc., then bid on the annotations. For each annotation, the advertiser having the winning bid is selected. For example, as shown in step 120 in FIG. 2, advertiser R1 has successfully won bids on annotations $A1_{V1}$, $A2_{V2}$ and $A3_{P1}$. Advertiser R2 has successfully won a bid on annotation $A3_{V1}$. Advertiser R3 hasn't won any bids. As a result, advertiser R1 prepares advertisements $AD1_{V1}$, $AD2_{V2}$ and $AD3_{P1}$ as shown in step 130. Similarly, advertiser R2 prepares advertisement $AD3_{V1}$. In optional aspects of the invention, the advertiser may only have his/her advertising linked to the annotation up to such point in time that his/her adverting budget is exhausted.

In preferred aspects of the invention, advertisers/retailers R1, R2, R3, etc. bid on the annotations directly over the internet. In one aspect, the annotations are sent to an advertising server and the advertising server associates the advertising with the annotations. In another aspect, the annotations are sent to a $3^{rd}$ party advertising service and the a $3^{rd}$ party advertising service associates the advertising with the annotations.

In an alternate aspect of the invention, each of the annotations $A1_{V1}$, $A2_{V2}$ . $A1_{V2}$, $A2_{V2}$ ... $A1_{P1}$, $A2_{P2}$, ... etc. are presented to a plurality of advertisers (e.g.: retailers R1, R2, R3, etc.). However, as distinguished from the above approach, the annotations are simply presented for sale over the internet. Thus, the individual advertisers R1, R2, R3, etc.) simply purchase the individual annotations, or the right to be linked to certain selected annotations $A1_{V1}$, $A2_{V2}$ ... $A1_{V2}$, $A2_{V2}$ ... $A1_{P1}$, $A2_{P2}$, ... etc.

Similar to the above approach, the annotations may either be sent to an advertising server (or a $3^{rd}$ party advertising service) and the advertising server (or $_3$rd party advertising service) associates the advertising with the annotations.

Figure 3:
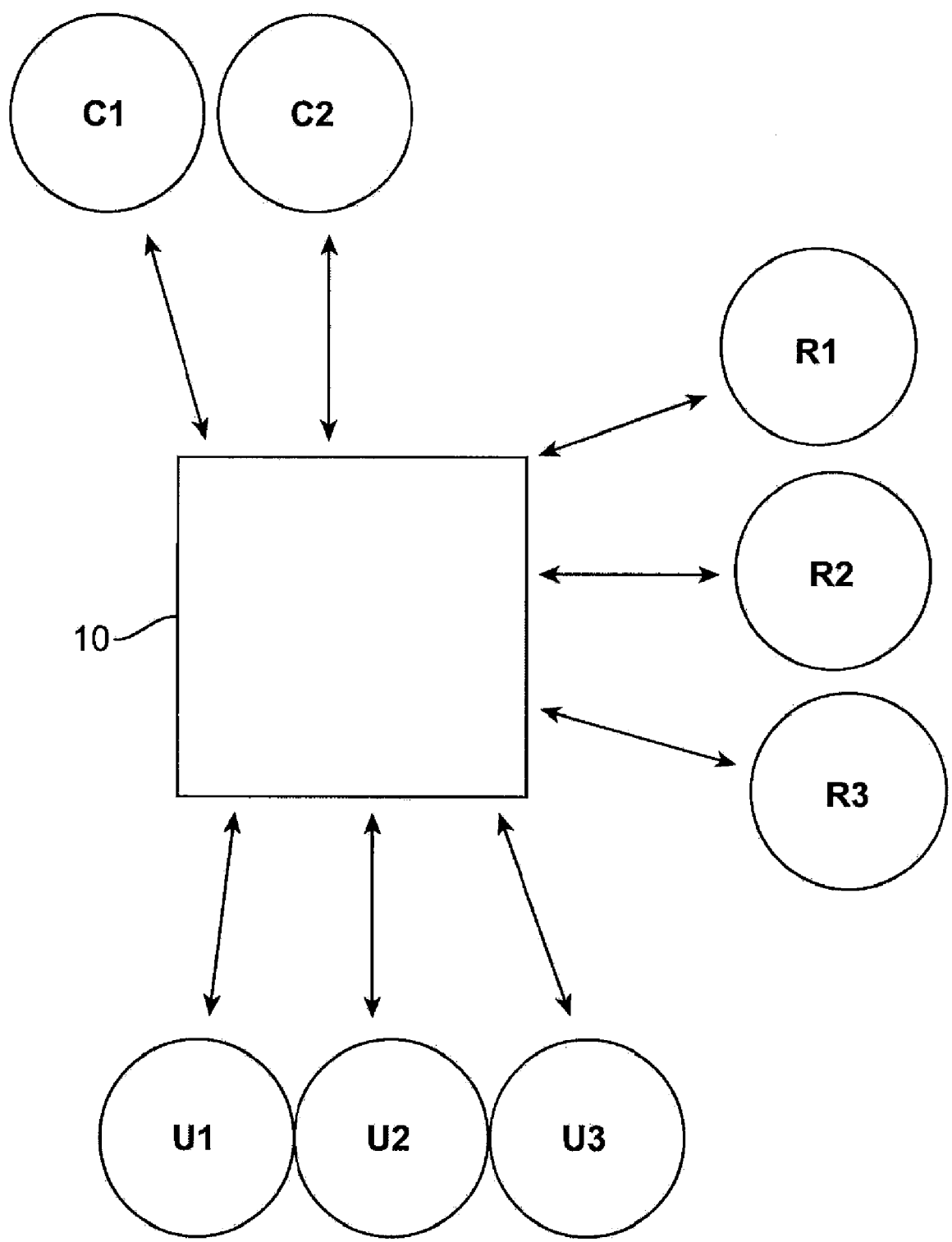
FIG. 3 is a schematic showing operation of the present invention.

FIG. 3 illustrates the present system in operation with a plurality of content creators C1 and C2 uploading content and annotations to system 10 while a plurality of advertisers/retailers R1, R2 and R3 prepare advertisements corresponding to the annotations such that a plurality of viewers/users U1, U2 and U3 viewing the internet content each see advertisements that correspond directly to the content they are viewing.

In accordance with the present invention, revenue is generated by revenue generation events in which the plurality of viewers U1, U2 and U3 view advertisements and/or occasionally initiate revenue generation events corresponding to the advertising associated to the content they are viewing. In accordance with the present invention, a portion of the revenue generated by revenue generation events may then be directed back the creators C1 and C2 of the content. Thus, content creators C1 and C2, etc. may be rewarded for creating the annotations in the first place.

Figure 4:
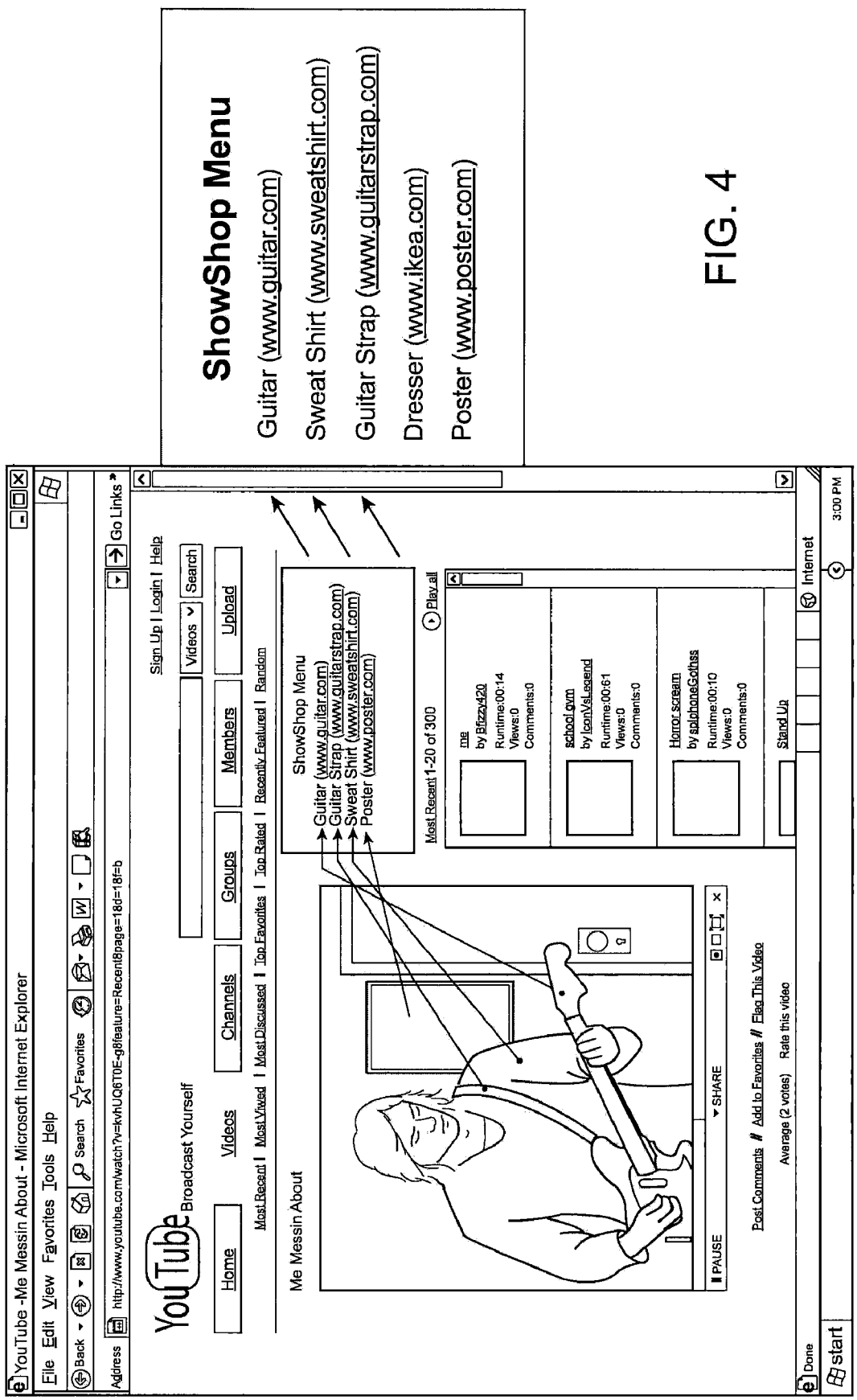
FIG. 4 is an example of how the system may be used in operation, as viewed by a user.

Operation of the present invention in use is illustrated in FIG. 4. Video V1 ("Me Playing Guitar") is being viewed (by user U1 as described above). When this occurs, advertisements corresponding to annotations A1V1, A2V1, A3V1 and A4V1 appear on the screen. Specifically, advertisements corresponding to each of "Guitar", "Guitar Strap", "Sweat Shirt" and "Poster" are shown on screen.

In optional aspects of the invention, cursor movement onto the product may prompt an advertisement for the product. For example, should the user move his/her cursor over the guitar in video V1, a pop-up advertisement may appear from guitar.com.

In optional aspects of the present invention, the content creator C may himself/herself select a product corresponding to the uploaded content; and present the content on the internet with the product directly associated to the content. This aspect of the present invention may be used in addition to, or instead of, having various retailers bid on or purchase rights to be associated with the annotations.

For example, the present invention also provides a method of associating products to internet content, by content creator C uploading content to a website while selecting a product that corresponds to the content, and uploading a product identifier to the website (or editing a product identifier on a website), wherein the product identifier corresponds to the selected product. The product identifier may be a UPC code, or an ISBN code. These UPC/ISBN codes may then be bid upon or purchased by advertisers, in a manner as described above. It is to be understood, however, that the present invention is not so limited. Other options and code types are possible.

An advantage of this optional aspect of the invention is that it avoids the need for retailers/advertisers to bid on or to purchase rights to be associated with the annotations. Instead, the links or advertisements are simply selected by the content creator C.

For example, a content creator may simply upload a photo of himself/herself to the internet. As a viewer/user U moves his/her cursor over the photo, links or advertisements to various products or advertisers may be displayed. For example, when the cursor points to the shirt of the person in the photo, or clicks the link that (for example) says "shirt", a pop-up linking to the retailer of the shirt may appear. Similarly, when the cursor points to a pen in the pocket of the shirt of the person in the photo, a pop-up linking to the retailer of the pen may appear. As such, the content creator C may directly link their uploaded content to an advertiser's website, such that a viewer U is directed to the advertiser's website.

In further optional aspects of the present invention, the retailers/advertisers are able to filter which types of videos or photographs they are associated with. Thus, retailers' products do not become associated with videos or photographs they deem to be objectionable.

In further optional aspects of the present invention, the annotations may be searchable by the content creator(s), the advertiser(s)/retailer(s) and the user(s)/viewer(s).

What is claimed:

1. A method of associating advertising to internet content, comprising:
    a user uploading content to a website or editing content on a website;
    the user selecting annotations that correspond to the content;
    the user uploading the annotations to the website or editing annotations on a website;
    the user associating the annotations with the content;
    associating advertising with the annotations by:
        presenting the annotations to a plurality of advertisers;
        having the plurality of advertisers bid on the annotations; and
        selecting a preferred advertiser having a winning bid from among the plurality of advertisers; and
    presenting the content on the internet with the advertising from the selected preferred advertiser associated to the content.

2. The method of claim 1, wherein the plurality of advertisers bid over the internet.

3. The method of claim 1, wherein the annotations are sent to an advertising server and the advertising server associates the advertising with the annotations.

4. The method of claim 1, wherein the annotations are sent to a $3^{rd}$ party advertising service and the a $3^{rd}$ party advertising service associates the advertising with the annotations.

5. The method of claim 1, wherein the annotations are selected by a creator of the content.

6. The method of claim 5, wherein the content is viewed on the internet by a plurality of viewers.

7. The method of claim 6, wherein revenue is generated by the plurality of viewers viewing advertising associated to the content, and wherein a portion of the revenue is directed to the creator or owner of the content.

8. The method of claim 1, wherein the user selecting annotations that correspond to the content comprises the user selecting a product corresponding to the content.

9. The method of claim 8, wherein presenting the content on the internet with the product associated to the content comprises:
    cursor movement onto the product prompting an advertisement for the product.

10. The method of claim 9, wherein the advertisement appears in a pop-up window or in an existing window.

11. The method of claim 1, wherein the content is a photograph.

12. The method of claim 1, wherein the content is text.

13. A method of associating advertising to internet content, comprising:
    uploading content to a website or editing content on a website;
    selecting annotations that correspond to the content;
    uploading the annotations to the website or editing annotations on a website;
    associating the annotations with the content;
    associating advertising with the annotations;
    presenting the content on the internet with the advertising associated to the content, wherein the content is a video.

14. The method of claim 13, further comprising:
    segmenting the video into time intervals; and
    associating annotations with each segment of the video.

15. The method of claim 13 or 14, wherein selecting the annotations that correspond to the content comprises writing a general description of the content.

16. The method of claim 13 or 14, wherein selecting the annotations that correspond to the content comprises selecting key words for the content.

17. The method of claim 1 or 13, wherein associating advertising with the annotations comprises:
    presenting the annotations to a plurality of advertisers; and
    having individual advertisers purchase individual annotations.

18. The method of claim 17, wherein the annotations are sent to an advertising server and the advertising server associates the advertising with the annotations.

19. The method of claim 17, wherein the annotations are sent to a $3^{rd}$ party advertising service and the a $3^{rd}$ party advertising service associates the advertising with the annotations.

20. The method of claim 1 or 13, further comprising:
selecting a product corresponding to the content; and
presenting the content on the internet with the product associated to the content.

21. The method of claim 20, wherein presenting the content on the internet with the product associated to the content comprises:
cursor movement onto the product prompting an advertisement for the product.

22. The method of claim 21, wherein the advertisement appears in a pop-up window or in an existing window or media player.

23. A method of associating products to internet content, comprising:
uploading content to a website or editing content on a website;
selecting a product that corresponds to the content;
uploading a product identifier to the website or editing a product identifier on a website, the product identifier corresponding to the product;
associating the product identifier with the content; and
presenting the content on the internet with the product identifier associated to the content, wherein the product identifier is a UPC code.

24. A method of associating products to internet content, comprising:
uploading content to a website or editing content on a website;
selecting a product that corresponds to the content;
uploading a product identifier to the website or editing a product identifier on a website, the product identifier corresponding to the product;
associating the product identifier with the content; and
presenting the content on the internet with the product identifier associated to the content, wherein the product identifier is an ISBN code.

25. A method of associating products to internet content, comprising:
uploading content to a website or editing content on a website;
selecting a product that corresponds to the content;
uploading a product identifier to the website or editing a product identifier on a website, the product identifier corresponding to the product;
associating the product identifier with the content; and
presenting the content on the internet with the product identifier associated to the content, wherein the content is a video.

26. The method of claim 25, further comprising:
segmenting the video into time intervals; and
associating product identifiers with each segment of the video.

27. A computer system, comprising:
a computer system configured to receive content to a website;
a computer system configured to receive annotations from a user and associate the annotations to the content as defined by the user;
a computer system configured to associate advertising with the annotations by receiving bids on associating advertising with the annotations from a plurality of advertisers; and
a computer system configured to present the content on the internet together with the advertising that won the bids for associating the advertising with the annotations.

28. A method of associating advertising to internet content, comprising:
a user uploading content to a website or editing content on a website;
the user selecting annotations that correspond to the content;
the user uploading the annotations to the website or editing annotations on a website;
the user associating the annotations with the content;
associating advertising with the annotations by:
presenting the annotations to a plurality of advertisers;
having the plurality of advertisers individually purchase the annotations; and
presenting the content on the internet with the advertising from the selected preferred advertiser associated to the content.

29. A computer system, comprising:
a computer system configured to receive content to a website;
a computer system configured to receive annotations from a user and associate the annotations to the content as defined by the user;
a computer system configured to associate advertising with the annotations by having the plurality of advertisers individually purchase the annotations; and
a computer system configured to present the content on the internet together with the advertising associated with the content.

* * * * *

UNITED STATES PATENT AND TRADEMARK OFFICE
CERTIFICATE OF CORRECTION

PATENT NO.      : 7,593,965 B2                                    Page 1 of 1
APPLICATION NO. : 11/447414
DATED           : September 22, 2009
INVENTOR(S)     : Ty William Gabriel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 263 days.

Signed and Sealed this

Twenty-eighth Day of September, 2010

David J. Kappos
*Director of the United States Patent and Trademark Office*